United States Patent
Choi et al.

(10) Patent No.: US 12,463,238 B2
(45) Date of Patent: Nov. 4, 2025

(54) SECONDARY BATTERY AND METHOD FOR MANUFACTURING THE SAME

(71) Applicant: LG CHEM, LTD., Seoul (KR)

(72) Inventors: Eun Seok Choi, Daejeon (KR); Hyun Tae Kim, Daejeon (KR); Kyoung Won Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 238 days.

(21) Appl. No.: 17/058,060

(22) PCT Filed: Jan. 10, 2020

(86) PCT No.: PCT/KR2020/000499
§ 371 (c)(1),
(2) Date: Nov. 23, 2020

(87) PCT Pub. No.: WO2020/145737
PCT Pub. Date: Jul. 16, 2020

(65) Prior Publication Data
US 2021/0159535 A1    May 27, 2021

(30) Foreign Application Priority Data
Jan. 10, 2019  (KR) .......... 10-2019-0003324

(51) Int. Cl.
*H01M 10/04* (2006.01)
*H01M 4/04* (2006.01)
(Continued)

(52) U.S. Cl.
CPC ....... *H01M 10/049* (2013.01); *H01M 4/0447* (2013.01); *H01M 10/058* (2013.01);
(Continued)

(58) Field of Classification Search
CPC .. H01M 10/049; H01M 10/058; H01M 10/04; H01M 10/446; H01M 10/44;
(Continued)

(56) References Cited

U.S. PATENT DOCUMENTS

| 2003/0008213 A1* | 1/2003 | Cho .................. H01M 4/0404 |
| | | 429/231.95 |
| 2005/0069763 A1 | 3/2005 | Hong et al. |

(Continued)

FOREIGN PATENT DOCUMENTS

| CN | 108299583 A | 1/2017 |
| DE | 10 2009 035 466 A1 | 2/2011 |

(Continued)

OTHER PUBLICATIONS

English translation of KR 20130132343A—system and method for aging battery unit of battery pack; PMGROW Corp; Dec. 4, 2013 (Year: 2013).*

(Continued)

*Primary Examiner* — Adam J Francis
(74) *Attorney, Agent, or Firm* — Birch, Stewart, Kolasch & Birch, LLP

(57) ABSTRACT

A method for manufacturing a secondary battery, having an activation process, in which charging/discharging and aging are performed, according to the present invention comprises: a step of providing a first cell and a second cell, each of which has a structure in which an electrode assembly is embedded in a pouch, and a negative electrode lead and a positive electrode lead protrude to the outside of the pouch; a step of stacking the first cell and the second cell; and a step of bonding the positive electrode leads of the first and second cells to each other and bonding the negative electrode leads of the first and second cells to each other, wherein each of the first and second cells is individually (Continued)

activated before the step of providing the first cell and the second cell.

7 Claims, 7 Drawing Sheets

(51) Int. Cl.
*H01M 10/058* (2010.01)
*H01M 50/105* (2021.01)
*H01M 50/116* (2021.01)
*H01M 50/211* (2021.01)
*H01M 50/50* (2021.01)
*H01M 50/502* (2021.01)

(52) U.S. Cl.
CPC ....... *H01M 50/105* (2021.01); *H01M 50/116* (2021.01); *H01M 50/211* (2021.01); *H01M 50/50* (2021.01); *H01M 50/502* (2021.01)

(58) Field of Classification Search
CPC ............ H01M 50/105; H01M 50/116; H01M 50/211; H01M 50/502; H01M 50/50; H01M 50/512; H01M 50/209; H01M 4/0447
See application file for complete search history.

(56) References Cited

U.S. PATENT DOCUMENTS

| | | | |
|---|---|---|---|
| 2013/0323563 A1 | 12/2013 | Eo | |
| 2015/0118542 A1* | 4/2015 | Lee | H01M 10/049 429/156 |
| 2015/0380697 A1* | 12/2015 | Osborne | H01M 50/502 429/153 |
| 2016/0268648 A1* | 9/2016 | Ueno | H01M 4/043 |
| 2018/0159112 A1* | 6/2018 | Chung | H01M 50/70 |
| 2018/0198102 A1* | 7/2018 | Choi | H01M 10/446 |
| 2019/0299799 A1* | 10/2019 | Hinterberger | B60L 50/64 |
| 2020/0035966 A1 | 1/2020 | Jin et al. | |

FOREIGN PATENT DOCUMENTS

| | | | | |
|---|---|---|---|---|
| JP | 2004-55153 A | | 2/2004 | |
| JP | 2015-56347 A | | 3/2015 | |
| KR | 10-2005-0000725 A | | 1/2005 | |
| KR | 10-2006-0009411 A | | 1/2006 | |
| KR | 10-0560158 B1 | | 3/2006 | |
| KR | 10-2008-0042965 A | | 5/2008 | |
| KR | 20050000725 A | * | 6/2010 | ............ Y02E 60/10 |
| KR | 10-2011-0105945 A | | 9/2011 | |
| KR | 10-2013-0014252 A | | 2/2013 | |
| KR | 10-2013-0133585 A | | 12/2013 | |
| KR | 20130132343 A | * | 12/2013 | |
| KR | 10-2014-0030431 A | | 3/2014 | |
| KR | 10-1578940 B1 | | 12/2015 | |
| KR | 10-2016-0006414 A | | 1/2016 | |
| KR | 10-2016-0062898 A | | 6/2016 | |
| KR | 10-2017-0037157 A | | 4/2017 | |
| KR | 10-2017-0043313 A | | 4/2017 | |
| KR | 10-2018-0082759 A | | 7/2018 | |
| KR | 10-2018-0119321 A | | 11/2018 | |
| WO | WO-2013042612 A1 | * | 3/2013 | .......... H01M 2/0207 |
| WO | WO 2018/117563 A1 | | 6/2016 | |

OTHER PUBLICATIONS

Extended European Search Report for European Application No. 20738746.5, dated Jun. 21, 2021.
International Search Report for PCT/KR2020/000499 (PCT/ISA/210) mailed on Apr. 21, 2020.

* cited by examiner

SECONDARY BATTERY AND METHOD FOR MANUFACTURING THE SAME

CROSS-REFERENCE TO RELATED APPLICATION

The present application claims the benefit of the priority of Korean Patent Application No. 10-2019-0003324, filed on Jan. 10, 2019, which is hereby incorporated by reference in its entirety.

TECHNICAL FIELD

The present invention relates to a secondary battery that requires a high energy density and a method for manufacturing the same, and more particularly, to a secondary battery, which is activated by using a small charger according to a related art, and a method for manufacturing the same.

BACKGROUND ART

Recently, the demand for secondary batteries as a source of energy is increasing rapidly. Such a secondary battery may be used in the form of a single battery cell or in the form of a battery module in which a plurality of battery cells are electrically connected to each other according to a type of external devices. For example, small devices such as mobile phones operate for a predetermined time with an output and capacity of one battery cell. On the other hand, medium or large devices such as notebook computers, portable DVDs, personal computers, electric vehicles, hybrid electric vehicles, etc., requires the use of battery modules comprising a large number of battery cells due to their output and capacity issues.

Such a secondary battery is manufactured through a process of assembling a battery cell and a process of activating the battery. Here, the battery activation process is usually performed by repeatedly applying current to a battery cell that is a target object to be charged/discharged or repeatedly discharging the battery cell through a charging/discharging device comprising positive and negative electrode contact devices and then by being aged for a predetermined time. The charging/discharging device of the secondary battery comprises a tray to which the battery cell is fixed and a contact device connected to a positive electrode and a negative electrode of the battery cell fixed to the tray to perform the charging/discharging.

In the case of the secondary battery mounted on an energy storage system (ESS), the secondary battery has a large thickness to increase in energy density.

As illustrated in FIG. 1, which illustrates a state in which two electrode assemblies are mounted in one pouch to manufacture a high-capacity battery that increases in thickness and is simplified in process, electrode assemblies 2 are respectively seated in one pouch 1 in which two seating parts (portions that are concavely recessed so that the electrode assemblies are seated in FIG. 1) are formed on both sides thereof, and then centers 1b of the seating parts 1a are folded to increase in thickness.

However, this structure has advantages in view of problems that a folding process is more complicated when the number of bi-cells constituting the electrode assembly increases, and existing devices are required to be modified. On the other hand, there is a problem in that the existing charging/discharging device is not used. For example, in order to be fixed and seated on the tray of the charging/discharging device due to the increase in thickness, the tuning of the device is required, and a sliding position of the contact device has to be modified. Also, since the capacity increases, there is a problem that the activation process is difficult to be smoothly performed with the charging capacity of the existing charging/discharging device.

DISCLOSURE OF THE INVENTION

Technical Problem

Therefore, a main object of the present invention is to provide a method for manufacturing a secondary battery that comprises two (or more) electrode assemblies to increase in capacity, thereby perform an activation process by using an existing charging/discharging device.

Technical Solution

The present invention for achieving the above object provides a secondary battery and a method for manufacturing the secondary battery.

A method for manufacturing a secondary battery, according to the present invention comprises: individually activating a first cell and a second cell; providing the activated first cell and the activated second cell, each of which has a structure in which an electrode assembly is embedded in a pouch, and a negative electrode lead and a positive electrode lead protruding to the outside of the pouch; stacking the activated first cell and the activated second cell; and bonding the positive electrode lead of the first activated cell and the positive electrode lead of the activated second cell to each other and bonding the negative electrode lead of the first activated cell and the negative electrode lead of the activated second cell to each other.

The bonding between the negative electrode leads and the bonding between the positive electrode leads may be performed through welding.

Each of the pouch of the activated first cell and the pouch of the activated second cell may have a shape in which two planes parallel to each other are formed, and wherein in the stacking the first activated cell and the activated second cell, one of the planes of the pouch of the activated first cell and one of the planes of the pouch of the activated second cell may be stacked to contact each other.

Here, the stacking the activated first cell and the activated second cell so that the positive electrode lead of the activated first cell and the positive electrode lead of the second cell are directed in a same direction (i.e., in parallel to each other), and the negative electrode lead of the activated first cell and the negative electrode lead of the second cell are directed in a same direction (i.e., in parallel to each other).

Also, the method may further comprise attaching a tape between the pouch of the activated first cell and the pouch of the activated second cell to adhere the first pouch to the second pouch. The tape may comprise an insulating tape having electrical insulation.

Alternatively, the method may further comprise applying an adhesive, between the pouch of the activated first cell and the pouch of the activated second cell to adhere the first pouch to the second pouch.

Here, the pouch of the activated first cell and the pouch of the activated second cell may have a same shape and size.

Furthermore, in the manufacturing method according to the present invention, a third cell may be additionally stacked. That is, the method may further comprise: activating a third cell in which the charging/discharging and the aging are performed and having a structure in which an electrode assembly is embedded in a pouch, and a negative electrode lead and a positive electrode lead protrude to the outside of the pouch; stacking the activated third cell on the activated second cell coupled to the activated first cell so that the activated second cell is disposed between the activated first cell and the activated third cell; and bonding the positive electrode lead of the activated second cell and the positive electrode lead of the activated third cell to each other and bonding the negative electrode lead of the activated second cell and the negative electrode lead of the activated third cell to each other.

Here, the pouch of the activated third cell may have a shape that is capable of adhering to the pouch of the activated first cell and the pouch of the activated second cell. The method may further comprise attaching a tape between the pouch of the activated second cell and the pouch of the activated third cell to adhere the activated third cell to the activated second cell. Alternatively, the method may further comprise applying an adhesive between the pouch of the activated second cell and the pouch of the activated third cell to adhere the activated third cell to the activated second cell.

In addition, a secondary battery manufactured through an activation process in which charging/discharging and aging are performed, according to the present invention comprises: a first cell which is subjected to the activation process and has a structure in which an electrode assembly is embedded in a pouch, and a negative electrode lead and a positive electrode lead protrude to the outside of the pouch; and a second cell having a structure in which an electrode assembly is embedded in a pouch, and a negative electrode lead and a positive electrode lead protrude to the outside of the pouch and which is subjected to an activation process, wherein the activated second cell is stacked on the activated first cell, and the negative electrode lead and the positive electrode lead are bonded to the negative electrode lead and the positive electrode lead of the activated first cell, respectively, so as to be connected parallel to each other, wherein surfaces of the activated first cell and the activated second cell, which are stacked to contact each other, adhere to each other.

Here, a third cell may be added. That is, the secondary battery may further comprise a third cell which is subjected to the activation process and has a structure in which an electrode assembly is embedded in a pouch, and a negative electrode lead and a positive electrode lead protrude to the outside of the pouch, wherein the activated third cell is stacked on the activated second cell at an opposite position of the activated first cell, and the negative electrode lead and the positive electrode lead of the activated third cell are bonded to the negative electrode lead and the positive electrode lead of each of the activated first cell and the activated second cell, respectively, so as to be connected parallel to each other, wherein surfaces of the activated third cell and the activated second cell, which are stacked to contact each other, may adhere to each other.

The adhesion between the activated first cell and the activated second cell may be performed by a tape stacked between the activated first cell and the activated second cell.

Advantageous Effects

According to the present invention having the above technical features, since the first cell and the second cell are stacked and bonded after being subjected to the activation process, the small and medium-sized charging/discharging device according to the related art may be used.

Since the first cell and the second cell are connected parallel to each other, the charging capacity may increase, and the third cell may be added to more increase in charging capacity.

MODE FOR CARRYING OUT THE INVENTION

Figure 1:
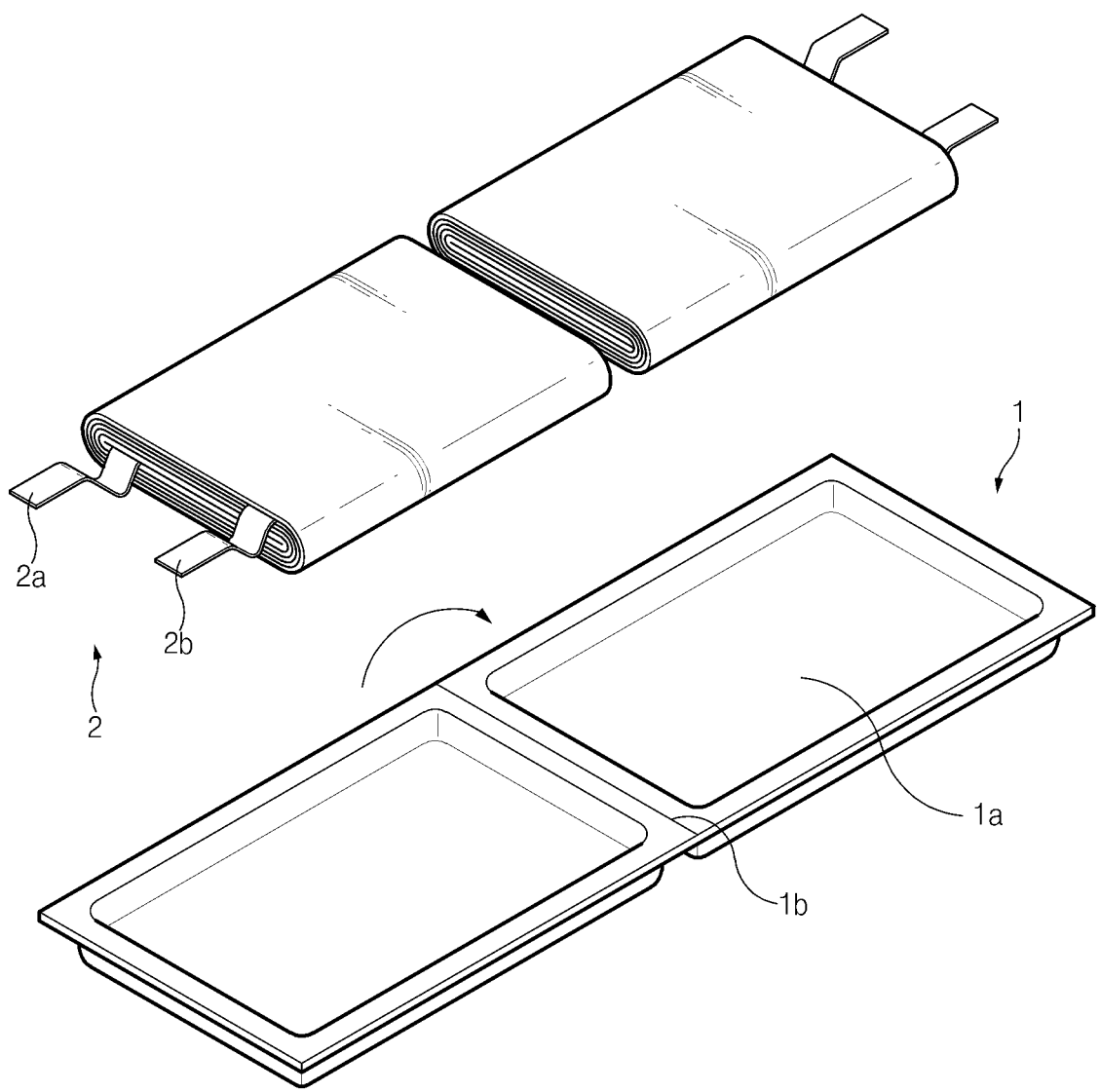
FIG. 1 is a perspective view of a secondary battery in which two electrode assemblies are mounted in one pouch.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a secondary battery in which two (or more) secondary batteries are provided to increase in capacity, and an activation process is performed by using the existing charging/discharging device. Hereinafter, embodiments according to the present invention will be described in more detail with reference to the accompanying drawings.

First Embodiment

A method for manufacturing a secondary battery which uses the existing small and medium-sized charging/discharging device and increases in capacity will be described according to a first embodiment of the present invention.

Figure 4:
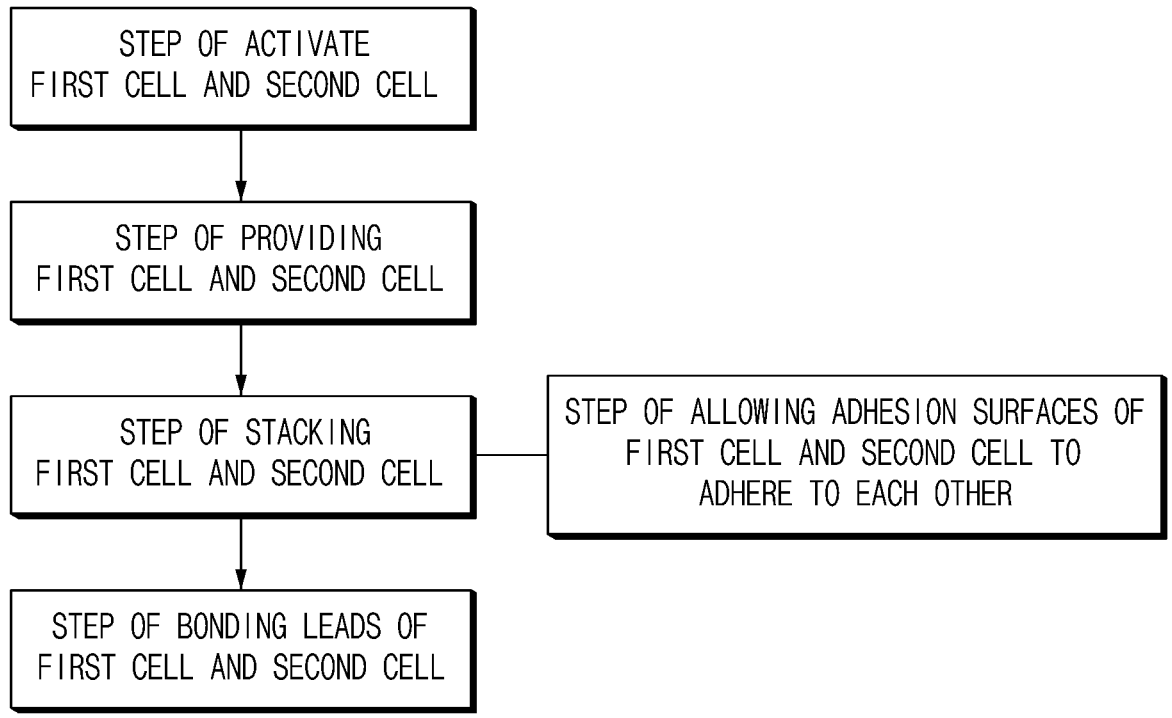
FIG. 4 is a flowchart illustrating a manufacturing method according to a first embodiment of the present invention.

As illustrated in FIG. 4, which illustrates a flowchart illustrating the manufacturing method according to the first embodiment, the manufacturing method according to this embodiment comprises a step of providing a first cell and a second cell, a step of stacking the first cell and the second cell, and a step of bonding leads (a positive electrode lead and a negative electrode lead) of the first cell and the second cell to each other. Each of the first cell and the second cell is provided in a state in which the activation process is individually performed.

Figure 2A:
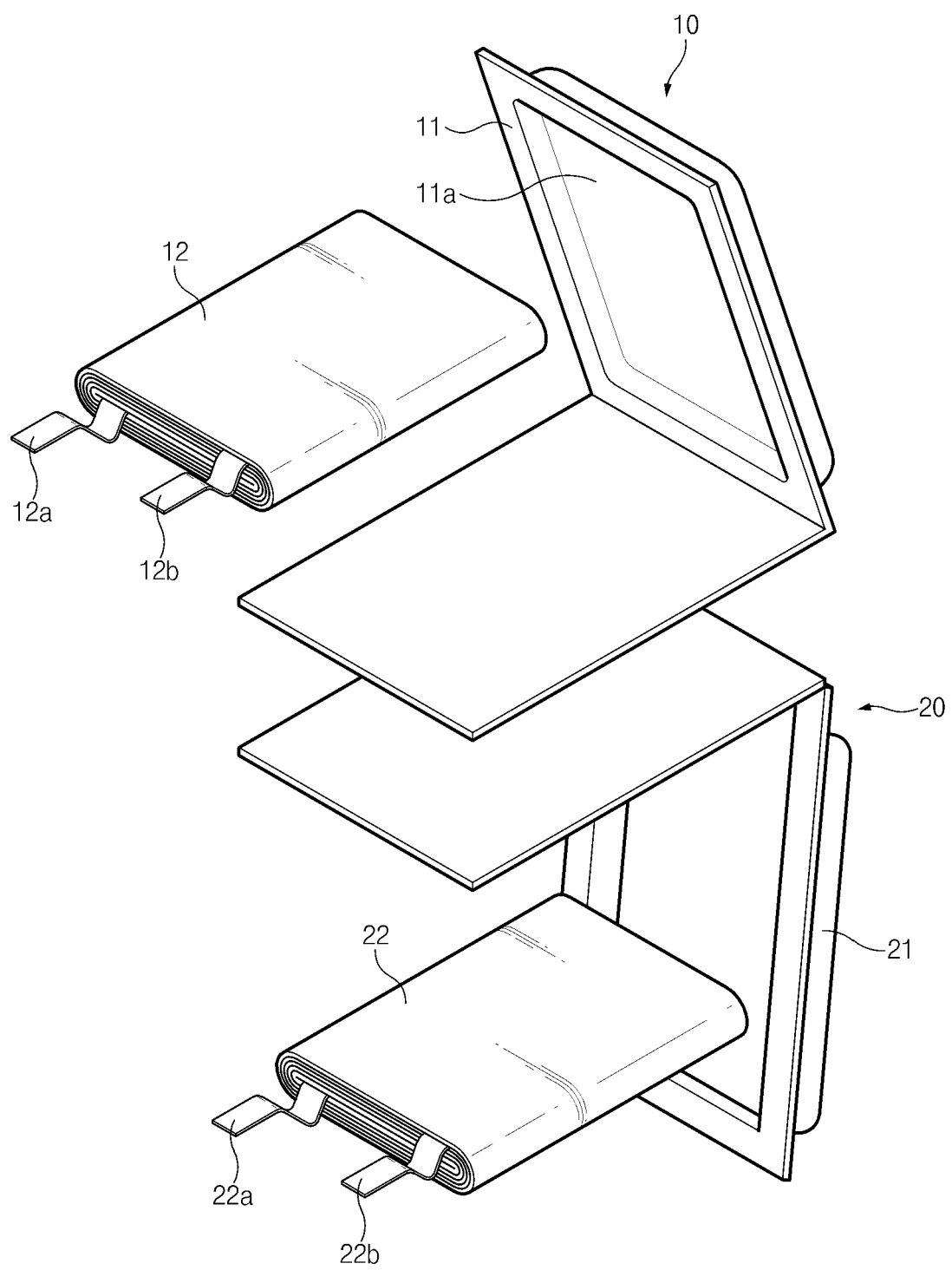
FIG. 2a is a perspective view illustrating a state in which an electrode assembly is embedded in a pouch of each of a first cell and a second cell.

That is, as illustrated in FIG. 2a which illustrates a state in which an electrode assembly is embedded in a pouch of each of a first cell and a second cell, each of the first cell 10 and the second cell 20 is provided in a state in which electrode assemblies 12 and 22 and an electrolyte (not shown) are embedded in pouches 11 and 21, and an activation process is performed.

Figure 2B:
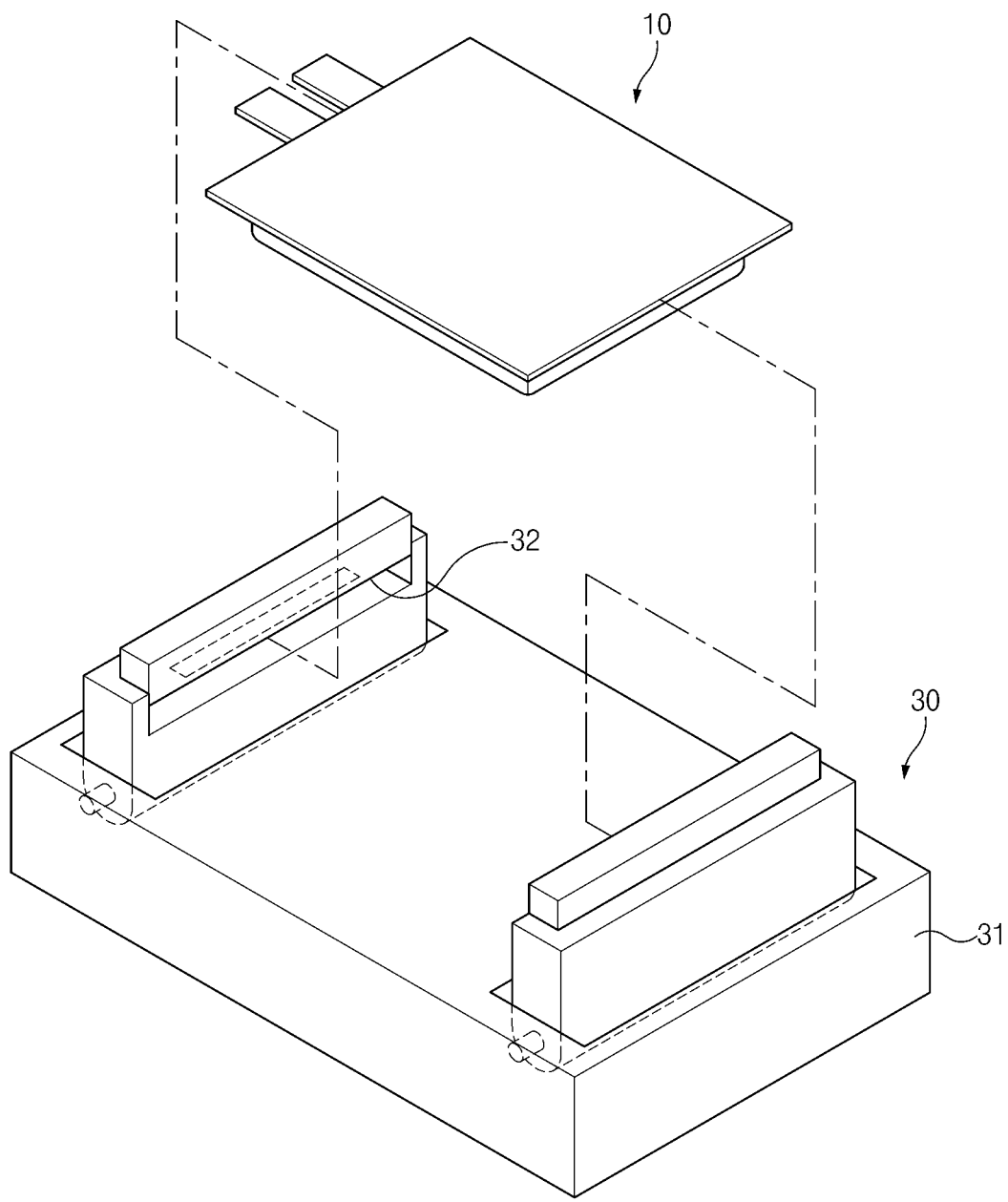
FIG. 2b is a perspective view illustrating a state before the first cell is mounted in a charging/discharging device.

In the first cell 10 and the second cell 20, each of positive electrode leads 12a and 22 a and negative electrode leads 12b and 22b protrudes to the outside of the pouches 11 and 22, an d each of the pouches 11 and 22 is manufactured to be sealed along an edge thereof in a state in which each of the electrode assemblies 12 and 22 is embedded in a seating part 11a. Also, as illustrated in FIG. 2b, which illustrates a state before the first cell 10 is mounted in the charging/discharging device 30, the activation process is performed through the small and medium-sized charging/discharging device 30 that is used in the related art.

The charging/discharging device 30 comprises a tray 31 on which the battery cell (the first cell or the second cell) is seated and fixed and a contact device 32 electrically contacting the positive electrode leads 12a and 22a and the negative electrode leads 12b and 22b of the electrode assembly. The charging/discharging device 30 is configured to apply current to the seated battery cell or discharge the current. The battery cell that is repeatedly charged and discharged through the charging/discharging device 30 is detached from the tray and then is aged in a space that is maintained at a predetermined temperature and humidity so that the activation process is completed.

Figure 2C:
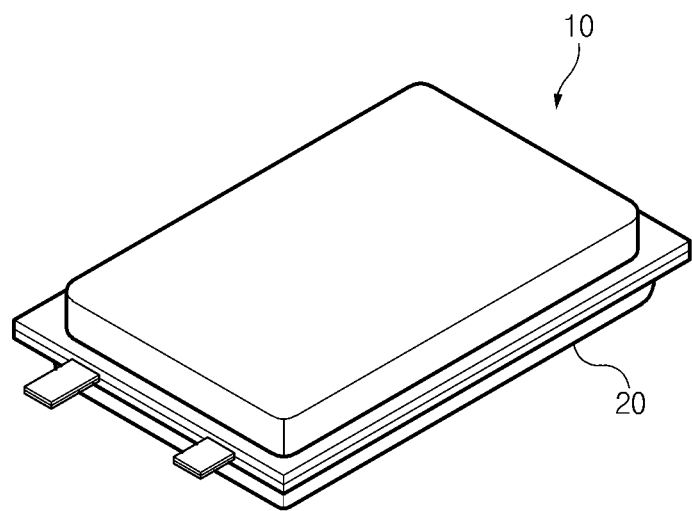
FIG. 2c is a perspective view illustrating a state before (lower figure) and after (upper figure) the first cell and the second cell are stacked.
Figure 2C:
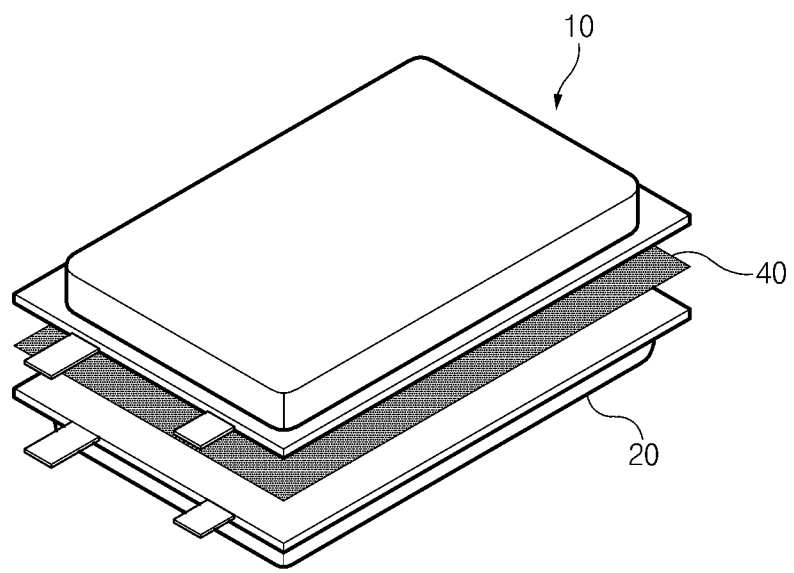

The first cell 10 and the second cell 20 on which the activation process is individually performed are stacked. That is, as illustrated in FIG. 2c, which illustrates a state before (lower figure) and after (upper figure) the first cell and the second cell are stacked, the pouch 11 of the first cell 10 and the pouch 21 of the second cell 20, each of which has two planes parallel to each other, have the same shape. In the step of stacking the first cell 10 and the second cell 20, one of the planes of the pouch 11 of the first cell 10 and one of the planes of the pouch 21 of the second cell 20 are stacked to contact each other.

Here, one surface having a relatively larger area of the pouch 11 and one surface having a relatively larger area of the pouch 21 adhere to each other by using a tape 40 or an adhesive. The positive electrode leads 12a and 22a and the negative electrode leads 12b and 22b may be stacked to face the same direction so that the first cell 10 and the second cell 20 are connected parallel to each other.

Before the first cell 10 and the second cell 20 are stacked, a step of attaching a tape 40 between the pouch 11 of the first cell 10 and the pouch 21 of the second cell 20 or a step of applying an adhesive between the pouch 11 of the first cell 10 and the pouch 21 of the second cell 20 may be performed. Here, the tape 40 may be a double-sided tape, and it is preferable that each of the tape 40 and the adhesive are made of a material having electrical insulation to prevent the short circuit from occurring.

Figure 2D:
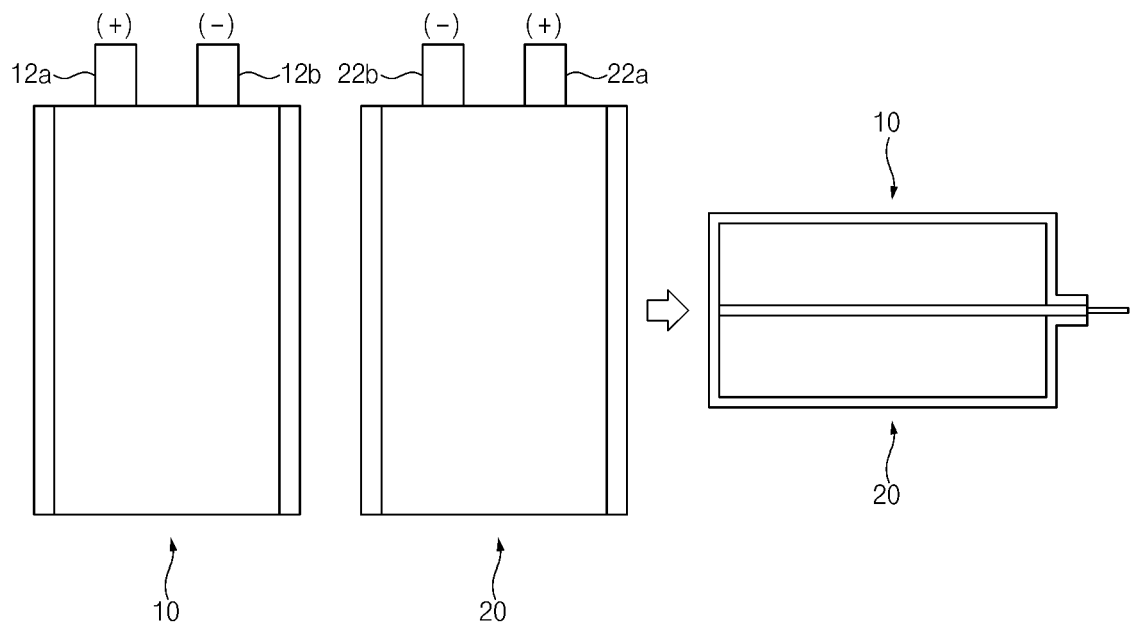
FIG. 2d is a plan view of a first cell and a second cell and a side view illustrating a state when the first cell and the second cell are stacked.

In the state in which the pouches 11 and 21 of the first and second cells 10 and 20 are bonded to each other, referring to FIG. 2d, which illustrates a plane view of the first cell and the second cell and a side view when the first cell and the second cell are stacked, the positive electrode leads 12a and 22a may be bonded to each other, and the negative electrode leads 12b and 22b may be bonded to each other so that the first cell 10 and the second cell 20 are connected parallel to each other.

Here, the bonding between the negative electrode leads and the bonding between the positive electrode leads may be performed through welding using ultrasonic or laser.

Second Embodiment

Furthermore, in the manufacturing method according to the present invention, a process of stacking a third cell 50 is additionally performed.

In this embodiment, a step of additionally providing and stacking the third cell 50 is further performed in addition to the steps according to the first embodiment. That is, in addition to the step of the manufacturing method according to the first embodiment, this embodiment further comprises a step of additionally providing the third cell 50 having a structure in which an electrode assembly is embedded in a pouch, and a negative electrode lead and a positive electrode lead protrude to the outside of the pouch, a step of stacking the third cell 50 on a second cell 20 coupled to a first cell 10 so that the second cell 20 is disposed between the first cell 10 and the third cell 50, and a step of bonding the positive electrode leads of the second cell 20 and the third cell 50 to each other and bonding the negative electrode leads of the second cell 20 and the third cell 50 to each other. Similarly, the third cell 50 is provided after being individually subjected to an activation process, in which charging/discharging and aging are performed.

Figure 3:
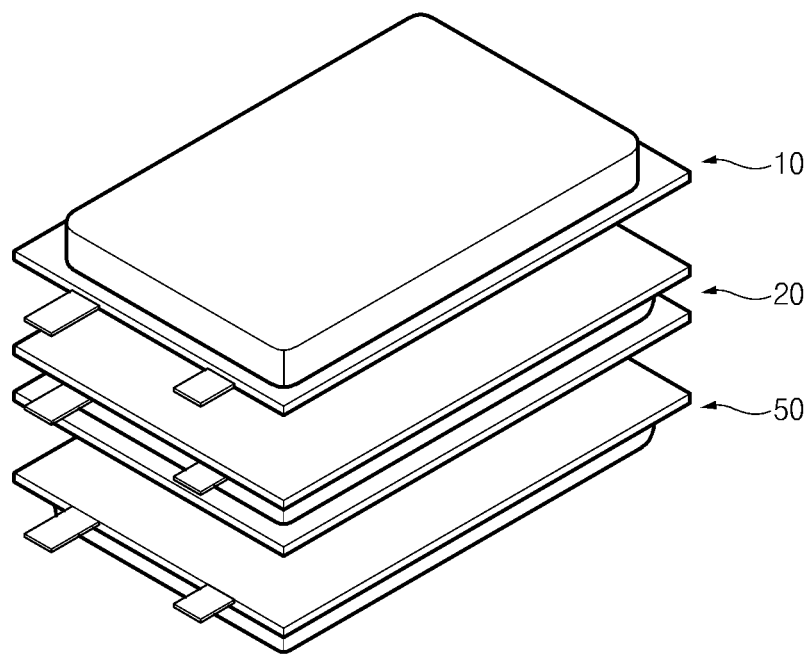
FIG. 3 is a perspective view illustrating a state before a first cell, a second cell, and a third cell are stacked.

The pouch of the third cell 50 is not particularly limited as long as the pouch has a shape that is capable of adhering to the pouch 11 of the first cell 10 and the pouch of the second cell 20. Referring to FIG. 3, which illustrates a state before the first cell, the second cell, and the third cell are stacked, it is preferable that the second cell 20 disposed between the first and third cells have both surfaces having the same area as the wide surface of the pouch of each of the first cell 10 and the second cell 50 so that both the surfaces of the third cell adhere.

Similarly, the third cell 50 adheres to the second cell 20 through a tape or an adhesive. The negative electrode lead and the positive electrode lead of the third cell 50 are bonded to the negative electrode lead and the positive electrode lead of each of the first and second cells so as to be connected to be parallel to each other, respectively.

Third Embodiment

This embodiment provides a secondary battery manufactured through the manufacturing method according to each of the first and second embodiments. The secondary battery provided in this embodiment may be a secondary battery that is manufactured by being subjected to an activation process in which charging/discharging and aging are performed. The secondary battery has a structure in which an electrode assembly is embedded in a pouch, and a negative electrode lead and a positive electrode lead protrude to the outside of the pouch and comprises a first cell 10 and a second cell 20, which are subjected to the activation process. Also, negative electrode leads and positive electrodes of the first cell 10 and the second cell 20 are bonded to each other so as to be connected parallel to each other so that the contact surfaces therebetween adhere to each other.

Also, the manufacturing method according to the second embodiment may be applied to add a third cell 50 in addition to the first cell 10 and the second cell 20. That is, the third cell 50 may be additionally bonded to an opposite surface of the second cell to which the first cell 10 adheres. Here, all the first cell 10, the second cell 20, and the third cell 50 may adhere in a state of being subjected to an activation process. A tape may be attached between the first cell 10 and the second cell 20 and between the second cell 20 and the third cell 50, or an adhesive may be applied between the first cell 10 and the second cell 20 and between the second cell 20 and the third cell 50 to allow the first, second, and third cells 10, 20, and 50 to adhere to each other. Here, the first, second, and third cells 10, 20, and 50 may be connected parallel to each other. Furthermore, a fourth cell and a fifth cell in addition to the third cell may be additionally stacked.

According to the present invention having the above technical features, since the first cell 10 and the second cell 20 are stacked and bonded after being subjected to the activation process, the small and medium-sized charging/discharging device according to the related art may be utilized.

Since the first cell 10 and the second cell 20 are connected parallel to each other, charging capacity may increase, and the third cell and the fourth cell may be sequentially added so that the charging capacity further increases.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing a secondary battery, the method comprising:
placing an electrode assembly in a seating part of a tray of a first pouch and sealing a planar cover to a flange of the tray with a negative electrode lead and a positive electrode lead extending out of the first pouch between the tray and cover to form a first cell;
placing an electrode assembly in a seating part of a tray of a second pouch and sealing a planar cover to a flange of the tray with a negative electrode lead and a positive electrode lead extending out of the second between the tray and cover to form a second cell;
individually activating the first cell and the second cell with a same charging/discharging device, wherein individually activating includes charging/discharging and aging;
stacking the activated first cell and the activated second cell so that the cover of the first cell contacts the cover of the second cell;
bonding the positive electrode lead of the activated first cell and the positive electrode lead of the activated second cell to each other and bonding the negative electrode lead of the activated first cell and the negative electrode lead of the activated second cell to each other;
activating a third cell in which charging/discharging and aging are performed and having a structure in which an electrode assembly is embedded in a pouch having a tray and cover, and a negative electrode lead and a positive electrode lead protrude to the outside of the pouch;
stacking the activated third cell on the activated second cell coupled to the activated first cell so that the activated second cell is disposed between the activated first cell and the activated third cell; and
bonding the positive electrode leads of the activated second cell and the activated third cell to each other and bonding the negative electrode lead of the activated second cell and the negative electrode lead of the activated third cell to each other,
wherein each of the pouches of the first cell and the third cell has two planes parallel to each other including a narrow surface of the tray and a wide surface of the cover, the wide surface being wider than the narrow surface,
wherein opposite surfaces of the tray and cover of the activated second cell have a same area as the wide surface of the pouch of each of the activated first cell and the activated third cell,
further comprising attaching a tape between the pouch of the activated first cell and the pouch of the activated second cell to adhere the first pouch to the second pouch, and
further comprising attaching a tape between the pouch of the activated second cell and the pouch of the activated third cell to adhere the activated third cell to the activated second cell,
wherein a first surface of the pouch of the second cell is adhered to the wide surface of the first cell pouch, and a second surface of the pouch of the second cell is adhered to the wide surface of the third cell pouch, and
wherein in the stacking direction of the activated first cell, the activated second cell, and the activated third cell, both the first surface and the second surface of the activated second cell have a same area as the wide surface of the pouch of each of the activated first cell and the activated third cell.

2. The method of claim 1, wherein the bonding between the negative electrode leads and the bonding between the positive electrode leads are performed through welding.

3. The method of claim 1, further comprising stacking the activated first cell and the activated second cell so that the positive electrode lead of the activated first cell and the positive electrode lead of the activated second cell are directed in a same direction, and the negative electrode lead of the activated first cell and the negative electrode lead of the activated second cell are directed in a same direction.

4. The method of claim 1, wherein the tape comprises an insulating tape having electrical insulation.

5. The method of claim 1, further comprising applying an adhesive between the pouch of the activated first cell and the pouch of the activated second cell to adhere the first pouch to the second pouch.

6. The method of claim 1, wherein the pouch of the activated third cell has a shape that is capable of adhering to the pouch of the activated first cell and the pouch of the activated second cell.

7. The method of claim 1, further comprising applying an adhesive between the pouch of the activated second cell and the pouch of the activated third cell to adhere the activated third cell to the activated second cell.

* * * * *